United States Patent
Coda et al.

(10) Patent No.: US 9,416,435 B1
(45) Date of Patent: Aug. 16, 2016

(54) NON-EVAPORABLE GETTER ALLOYS PARTICULARLY SUITABLE FOR HYDROGEN AND CARBON MONOXIDE SORPTION

(71) Applicant: SAES GETTERS S.P.A., Lainate (IT)

(72) Inventors: Alberto Coda, Gerenzano (IT);
Alessandro Gallitognotta, Origgio (IT);
Antonio Bonucci, Hamburg (DE);
Andrea Conte, Milan (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 0 days.

(21) Appl. No.: 15/025,537

(22) PCT Filed: Nov. 19, 2014

(86) PCT No.: PCT/IB2014/066169
§ 371 (c)(1),
(2) Date: Mar. 28, 2016

(87) PCT Pub. No.: WO2015/075648
PCT Pub. Date: May 28, 2015

(30) Foreign Application Priority Data

Nov. 20, 2013 (IT) .............................. MI2013A1921

(51) Int. Cl.
*B01D 53/02* (2006.01)
*C22C 30/00* (2006.01)
*C22C 1/04* (2006.01)
*B01D 53/04* (2006.01)
*H01J 61/26* (2006.01)

(52) U.S. Cl.
CPC ................ *C22C 30/00* (2013.01); *B01D 53/04* (2013.01); *C22C 1/0458* (2013.01); *H01J 61/26* (2013.01); *B01D 2253/1122* (2013.01); *B01D 2257/108* (2013.01); *B01D 2257/502* (2013.01)

(58) Field of Classification Search
CPC ...... C22C 30/00; C22C 1/0458; B01D 53/04; B01D 2253/1122; B01D 2257/108; B01D 2257/502; H01J 61/26
See application file for complete search history.

(56) References Cited

U.S. PATENT DOCUMENTS

| 4,360,445 | A | | 11/1982 | Mendelsohn et al. |
| 4,839,085 | A | | 6/1989 | Sandrock et al. |
| 4,849,205 | A | * | 7/1989 | Hong .................... C01B 3/0005 420/421 |

(Continued)

FOREIGN PATENT DOCUMENTS

| EP | 0 719 609 A2 | 3/1996 |
| EP | 0 869 195 A1 | 10/1998 |

(Continued)

OTHER PUBLICATIONS

1—International Search Report issued for International Application No. PCT/IB2014/066169 filed on Nov. 19, 2014 in the name of SAES Getters S.P.A. Mail date: Mar. 17, 2015.

(Continued)

*Primary Examiner* — Christopher P Jones
(74) *Attorney, Agent, or Firm* — Steinfl & Bruno LLP

(57) ABSTRACT

Getter devices with improved sorption rate, based on powders of quaternary alloys particularly suitable for hydrogen and carbon monoxide sorption, are described. Quaternary alloys having a composition comprising zirconium, vanadium, titanium and aluminum as main constituent elements are also described.

10 Claims, 5 Drawing Sheets

(56) References Cited

U.S. PATENT DOCUMENTS

| | | | | |
|---|---|---|---|---|
| 5,096,667 | A | * | 3/1992 | Fetcenko .............. C01B 3/0031 420/580 |
| 5,104,617 | A | * | 4/1992 | Fetcenko .............. C01B 3/0031 420/588 |
| 5,324,172 | A | | 6/1994 | Manini et al. |
| 6,109,880 | A | * | 8/2000 | Krueger ................ C23C 14/564 417/48 |
| 6,149,392 | A | | 11/2000 | Conte |
| 7,635,949 | B2 | | 12/2009 | De Maagt et al. |
| 7,727,308 | B2 | * | 6/2010 | Coda .................... C01B 3/0031 252/181.1 |
| 8,961,816 | B2 | * | 2/2015 | Coda ...................... H01J 7/183 252/181.6 |
| 8,986,569 | B2 | * | 3/2015 | Kullberg ............... C01B 3/0026 252/181.1 |

FOREIGN PATENT DOCUMENTS

| | | |
|---|---|---|
| EP | 1 704 576 A2 | 9/2006 |
| WO | 2004/024965 A2 | 3/2004 |
| WO | 2010/105944 A1 | 9/2010 |
| WO | 2010/105945 A1 | 9/2010 |
| WO | 2013/175340 A1 | 11/2013 |

OTHER PUBLICATIONS

2—Written Opinion issued for International Application No. PCT/IB2014/066169 filed on Nov. 19, 2014 in the name of SAES Getters S.P.A. Mail date: Mar. 17, 2015.
3—International Preliminary Report on Patentability issued for International Application No. PCT/IB2014/066169 filed on Nov. 19, 2014 in the name of SAES Getters S.P.A. Mail date: Feb. 4, 2016.

* cited by examiner

NON-EVAPORABLE GETTER ALLOYS PARTICULARLY SUITABLE FOR HYDROGEN AND CARBON MONOXIDE SORPTION

CROSS REFERENCE TO RELATED APPLICATIONS

The present application is the U.S. national stage entry of International Patent Application No. PCT/IB2014/066169, filed internationally on Nov. 19, 2014, which, in turn, claims priority to Italian Patent Application No. MI2013A001921, filed on Nov. 20, 2013.

The present invention relates to new getter alloys having an increased hydrogen and carbon monoxide sorption rate, to a method for sorbing hydrogen with said alloys and to hydrogen-sensitive devices which employ said alloys for the removal of hydrogen.

The alloys which are the subject-matter of this invention are particularly useful for all the applications which require high sorption rate of significant quantities of hydrogen and carbon monoxide.

Among the most interesting applications for these new sorbing alloys there are illumination lamps, vacuum pumps and gas purification.

The use of getter materials for hydrogen removal in these applications is already known, but the currently developed and used solutions are not suitable for meeting the requirements which are imposed by the continuous technological developments which set more and more rigid limits and constraints.

In illumination lamps, with particular reference to high pressure discharge lamps and low pressure mercury lamps, the presence not only of hydrogen even at low levels but also of other gaseous contaminants significantly decreases the device performance. More information regarding the degradation phenomena can be found in EP 1704576 relating to a different material for hydrogen and residual carbon monoxide sorption.

In this particular applicative field not only the material capacity to effectively sorb hydrogen at high temperatures is particularly important, but for some lamps also a high sorption rate and low activation temperature of the material as regards to the sorption of other gas species, with respect to conventional NEG alloys.

Another applicative field which can benefit from the use of getter alloys capable of hydrogen sorption at high temperatures is that of getter pumps. This type of pumps is described in various patents such as U.S. Pat. No. 5,324,172 and U.S. Pat. No. 6,149,392, as well in the international patent publication WO 2010/105944, all in the name of the applicant. Being able to use the getter material of the pump at high temperature increases the performance thereof in terms of sorption capacity towards other gases, but in this case a high sorption rate is a main issue same as the capacity in order to obtain better device performances.

Another applicative field that benefits from the advantages of a getter material capable of hydrogen and carbon monoxide sorption with high sorption rate is the purification of the gases used in semiconductor industries. As a matter of fact, particularly when high flows are requested, typically higher than some l/min, the getter material has to quickly sorb gaseous species in order to remove gas contaminants such as $N_2$, $H_2O$, $O_2$, $CH_4$, CO, $CO_2$.

Two of the most efficient solutions for hydrogen removal are disclosed in EP 0869195 and in the international patent publication WO 2010/105945, both in the name of the applicant. The first solution makes use of Zirconium-Cobalt-RE alloys wherein RE can be a maximum of 10% and is selected among Yttrium, Lanthanum and other Rare Earths, In particular, the alloy having the following weight percentages: Zr 80.8%-Co 14.2% and RE 5%, has been particularly appreciated. Instead, the second solution makes use of Yttrium-based alloys in order to maximize the removable amount of hydrogen also at temperatures above 200° C. but their properties of irreversible gas sorption are essentially limited with respect to the needs of many applications requiring vacuum conditions.

A particular solution, useful for quickly gettering hydrogen and other undesired gases such as CO, $N_2$ and $O_2$ is described in U.S. Pat. No. 4,360,445, but the oxygen-stabilized zirconium-vanadium-iron intermetallic compound disclosed therein can be successfully used only in a particular range of temperature (i.e. −196° C. to 200° C.) that requires a large amount of oxygen lowering of sorption capacity and rate per gram, i.e. limiting its field of possible application.

As an alternative, U.S. Pat. No. 4,839,035 disclosed a non-evaporable getter alloy suitable to remove hydrogen and carbon monoxide focusing on Zr-rich compositions selected in the zirconium-vanadium-aluminum system. Even if those alloys seem to be effective in facilitating some steps in the manufacturing process, the absorption rates when exposed to $H_2$ and CO are not enough to be applied in many applications, as for example in getter pumps for high vacuum systems. The international patent publication number WO 2013/175340, in the applicant's name, describes some stable getter alloys containing zirconium, vanadium and titanium (i.e. not requiring a large amount of oxygen in order to obtain an intermetallic compound) and having an improved sorption capacity with respect to several gaseous contaminants. However, WO 2013/175340 is silent on the way to obtain an improvement of the sorption speed with respect to hydrogen and, simultaneously, to other gaseous species, i.e. carbon monoxide.

Therefore improved characteristics versus hydrogen and carbon monoxide of the alloys according to the present invention have to be intended and evaluated in a twofold possible meaning, namely an increased sorption rate for $H_2$ and with low hydrogen equilibrium pressure. For the most interesting alloys according to the present invention, this property should be considered and associated with an unexpected improved sorption performance with respect to other gaseous species and with particular reference to CO. Moreover, these alloy have shown lower activation temperatures and lower particle losses in combination with higher embrittlement and resistance to hydrogen cycling It is therefore an object of the present invention to provide getter devices based on the use of a new non-evaporable getter material capable of overcoming the disadvantages of the prior art. These objects are achieved by a getter device containing powders of a quaternary non-evaporable getter alloy, said non-evaporable getter alloy comprising as compositional elements zirconium, vanadium, titanium and aluminum and having an atomic percentage composition of said elements which can vary within the following atomic percentage ranges:
 a. zirconium from 38 to 44.8%
 b. vanadium from 14 to 29%
 c. titanium from 13 to 15%
 d. aluminum from 11.5 to 35%
said atomic percentage ranges being considered with respect to the sum of zirconium, vanadium, titanium and aluminum in the non-evaporable getter alloy.

Inventors have surprisingly found that quaternary alloys in the Zr—V—Ti—Al system have an improved $H_2$ and CO sorption rate when the titanium amount is selected in the range comprised between 13 and 15%.

Optionally, the non-evaporable getter alloy composition can further comprise as additional compositional elements one or more metals in an overall atomic concentration lower than 8% with respect to the total of the alloy composition. In particular, these one or more metals can be selected from the group consisting of iron, chromium, manganese, cobalt, and nickel in an overall atomic percentage preferably comprised between 0.1 and 7%, more preferably between 0.1 and 5%. Moreover, minor amounts of other chemical elements can be present in the alloy composition if their overall percentage is less than 1% with respect to the total of the alloy composition.

These and other advantages and characteristics of the alloys and devices according to the present invention will be clear to those skilled in the art from the following detailed description of some not limiting embodiments thereof with reference to the annexed drawings wherein.

In the field of getter pumps, the requirement is sorbing hydrogen in an effective way by operating at high temperatures, for example at 200° C., in such a way that the getter material is capable of effectively sorbing the other gas impurities as well $N_2$, $H_2O$, $O_2$, $CH_4$, $CO$, $CO_2$ possibly present in the chamber that is to be evacuated. In this case, all the alloys which are the subject-matter of the present invention have features that are advantageous in this application, whereby those having higher affinity toward several gas impurities are particularly appreciated.

Figure 1:
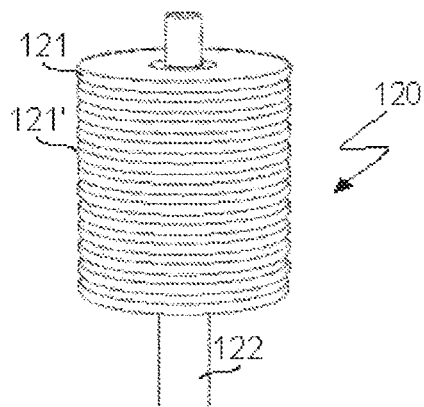
FIG. 1 shows a device containing getter bodies according to one embodiment of the present invention.
Figure 1A:
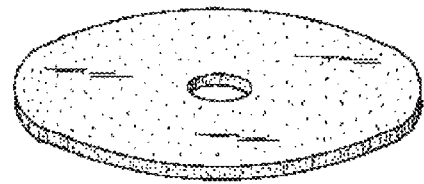
FIGS. 1a and 1b show some sintered getter bodies according to the present invention suitable to be used in the getter device of FIG. 1.
Figure 1B:
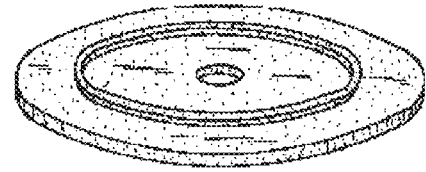

FIG. 1 shows discoidal getter elements (121, 121', ...) conveniently assembled in a stack (120) to obtain an object with increased pumping performances. The stack may be equipped with a heating element coaxial to the supporting element (122) and mounted on a vacuum flange or fixed in the vacuum chamber by means of suitable holders. Some not limiting embodiments of gettering elements suitable to be used to obtain said stacks are shown in FIGS. 1a and 1b.

Figure 2:
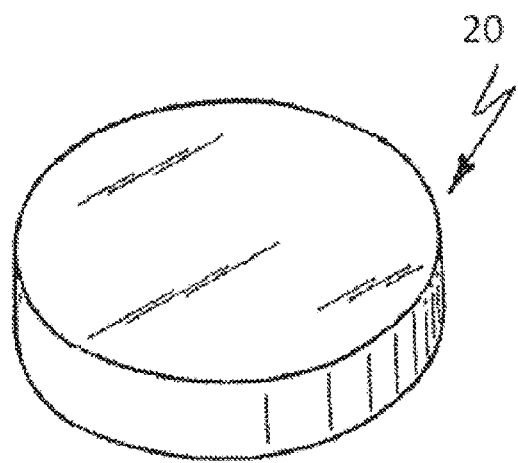
FIGS. 2 to 4 show devices made with a single compressed alloy body according to different possible embodiments.
Figure 3:
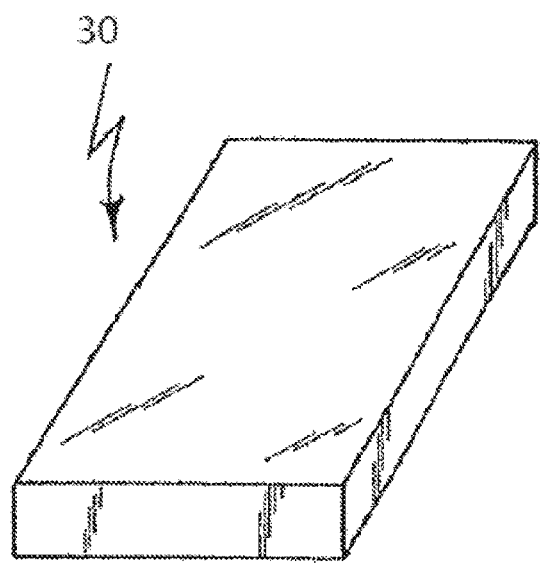

FIGS. 2 and 3 show, respectively, a cylinder 20 and a board 30 made by cutting an alloy sheet of suitable thickness or obtained by compression of alloy powders. For their practical use the devices must be positioned in a fixed position in the container that is to be maintained free from hydrogen. The devices 20 and 30 could be fixed directly to an internal surface of the container, for example by spot welding when said surface is made of metal. Alternatively, devices 20 or 30 can be positioned in the container by means of suitable supports, and the mounting on the support can be carried out by welding or mechanical compression.

Figure 4:
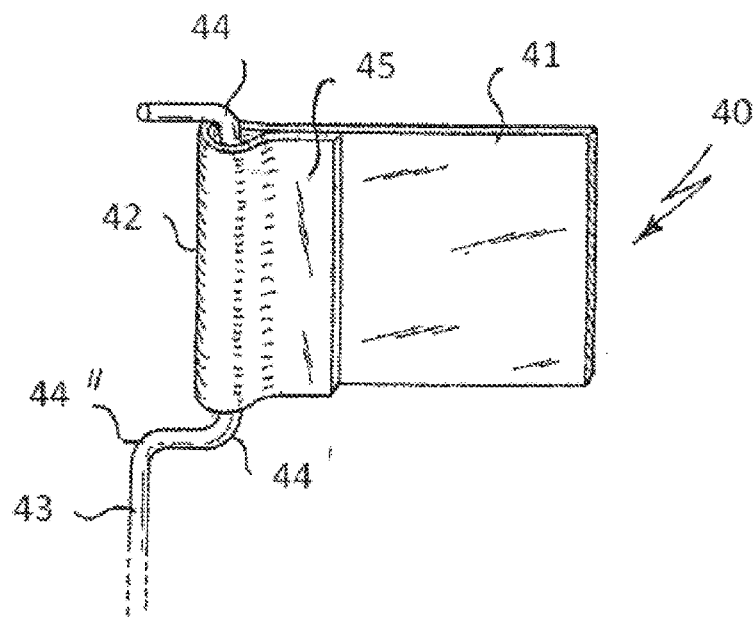

FIG. 4 shows another possible embodiment of a getter device 40, wherein a discrete body of an alloy according to the invention is used, particularly for those alloys having high plasticity features. In this case the alloy is manufactured in the form of a strip from which a piece 41 having a desired size is cut, and the piece 41 is bent in its portion 42 around a support 43 in the form of a metal wire. Support 43 may be linear but it is preferably provided with curves 44, 44', 44'' that help the positioning of piece 41, whose shaping can be maintained by means of one or several welding points (not shown in the figure) in the overlapping zone 45, although a simple compression during the bending around support 43 can be sufficient considering the plasticity of these alloys.

Alternatively, other getter devices according to the invention can be manufactured by using powders of the alloys. In the case that powders are used, these preferably have a particle size lower than 500 µm, and even more preferably lower than 300 µm, in some applications being included between 0 and 125 µm.

Figure 5:
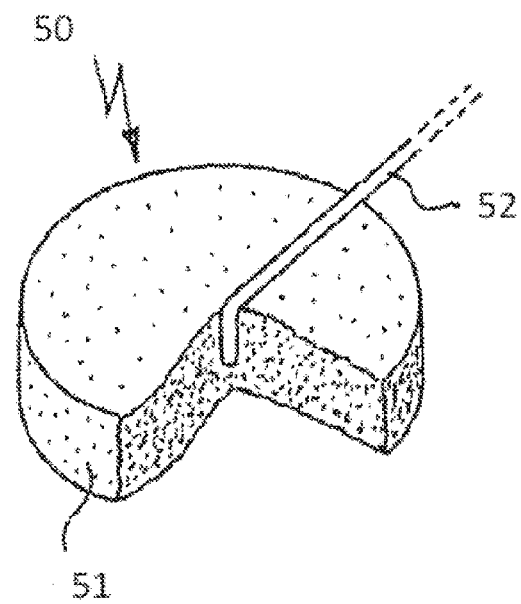
FIGS. 5 to 8 show other getter devices based on alloy powders according to the present invention.

FIG. 5 shows a broken view of a device 50, having the shape of a tablet 51 with a support 52 inserted therein; such a device can be made for example by compression of powders in a mold, having prepared support 52 in the mold before pouring the powder. Alternatively, support 52 may be welded to tablet 51.

Figure 6:
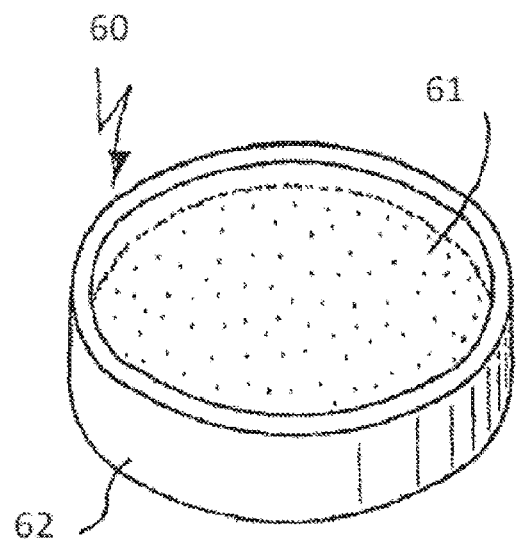

FIG. 6 shows a device 60 formed by powders of an alloy 61 according to the invention pressed in a metal container 62; device 60 may be fixed to a support (not shown in the figure) for example by welding container 62 thereto.

Figure 7:
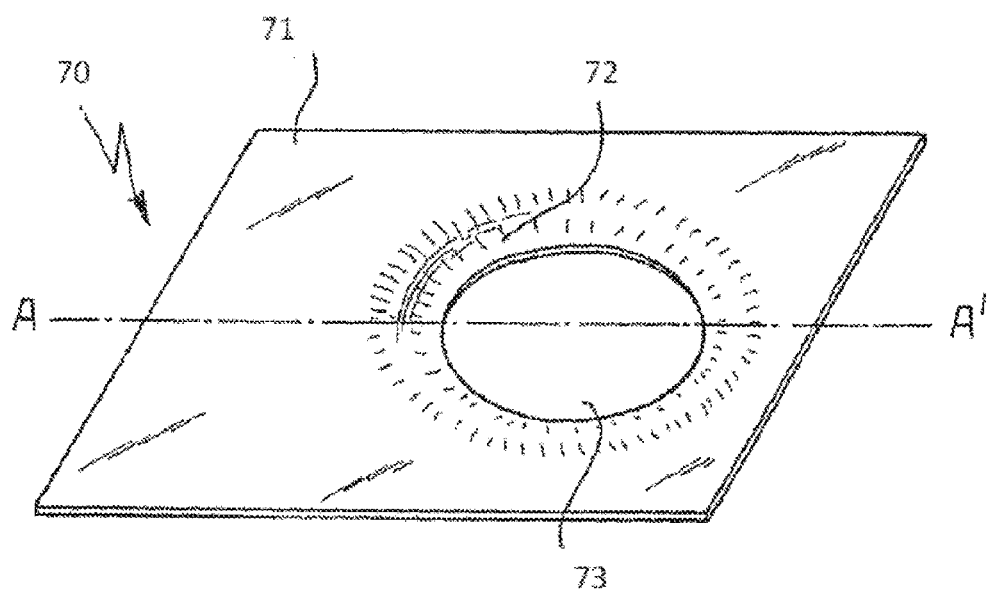
Figure 8:
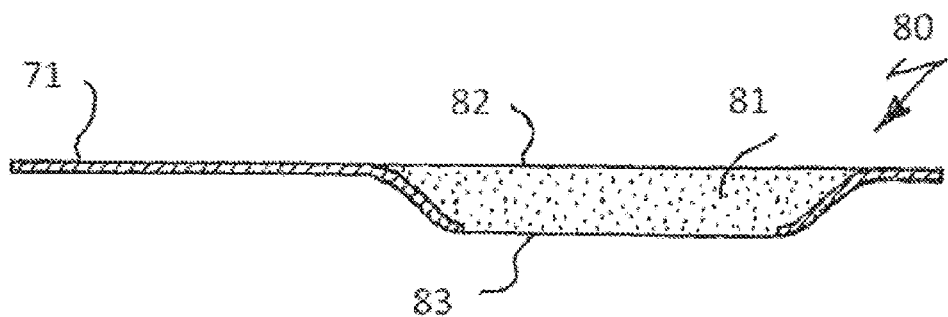

Finally, FIGS. 7 and 8 show another kind of device comprising a support 70 manufactured starting from a metal sheet 71 with a depression 72, obtained by pressing sheet 71 in a suitable mold. Most of the bottom part of depression 72 is then removed by cutting, obtaining a hole 73, and support 70 is kept within the pressing mold so that depression 72 can be filled with alloy powders which are then pressed in situ thus obtaining device 80 (seen in the section taken along line A-A' of FIG. 7) in which the powder package 81 has two exposed surfaces, 82 and 83, for the gas sorption.

In all the devices according to the invention the supports, containers and any other metal part which is not formed of an alloy according to the invention is made of metals having a low vapor pressure, such as tungsten, tantalum, niobium, molybdenum, nickel, nickel iron or steel in order to prevent these parts from evaporating due to the high working temperature to which said devices are exposed.

The alloys useful for the getter devices according to the invention can be produced by melting the pure elements, preferably in powder or pieces, in order to obtain the desired atomic ratios. The melting must be carried out in a controlled atmosphere, for example under vacuum or inert gas (argon is preferred), in order to avoid the oxidation of the alloy which is being prepared. Among the most common melting technologies, but not limited to these, arc melting, vacuum induction melting (VIM), vacuum arc remelting (VAR), induction skull meting (ISM), electro slug remelting (ESR), or electron beam melting (EBM) can be used. The sintering or high pressure sintering of the powders may also be employed to form many different shapes such as discs, bars, rings, etc. of the non-evaporable getter alloys of the present invention, for example to be used within getter pumps. In a possible embodiment of the present invention, moreover, sintered products can be obtained by using mixtures of getter alloy powders having a composition according to claim 1 optionally mixed with metallic powders such as, for example, titanium, zirconium or mixtures thereof, to obtain getter elements, usually in the form of bars, discs or similar shapes as well described for example in EP 0719609.

As an example, polycrystalline ingots can be prepared by arc melting of appropriate mixtures of the high purity constituent elements in an argon atmosphere. The ingot can be then grinded by ball milling in a stainless steel jar under argon atmosphere and subsequently sieved to a desired powder fraction, usually of less than 500 µm or more preferably less than 300 µm.

In a second aspect thereof, the invention consists in the use of a getter device as described above for hydrogen and carbon monoxide removal. For example, said use can be directed to hydrogen and carbon monoxide removal from a closed system or device including or containing substances or structural elements which are sensitive to the presence of said gases. Alternatively, said use can be directed to hydrogen and carbon monoxide removal from gas flows used in manufacturing processes involving substances or structural elements which are sensitive to the presence of said gases. Hydrogen and carbon monoxide negatively affect the characteristics or performances of the device and said undesired effect is avoided or limited by means of at least a getter device containing a quaternary non-evaporable getter alloy comprising as compositional elements zirconium, vanadium, titanium, aluminum and having an atomic percentage composition of said elements which can vary within the following ranges:

a. zirconium from 38 to 44.8%;
b. vanadium from 14 to 29%
c. titanium from 13 to 15%
d. aluminum from 11.5 to 35% said atomic percentage ranges being considered with respect to the sum of zirconium, vanadium, titanium and aluminum in the non-evaporable getter alloy.

Optionally, the non-evaporable getter alloy composition can further comprise as additional compositional elements one or more metals in an overall atomic concentration lower than 8% with respect to the total of the alloy composition. In particular, these metals can be selected from the group consisting of iron, chromium, manganese, cobalt, and nickel in an overall atomic percentage preferably comprised between 0.1 and 7%, more preferably between 0.1 and 5%. Moreover, minor amounts of other chemical elements can be present in the alloy composition if their overall percentage is less than 1% with respect to the total of the alloy composition.

The use according to the invention finds application by using the getter alloy in the form of powder, of powders pressed in pills, laminated on suitable metal sheets or positioned inside one of the suitable containers, possible variants being well known to the person skilled in the art.

Alternatively, the use according to the invention can find application by using the getter alloy in the form of sintered (or high-pressure sintered) powders, optionally mixed with metallic powders such as, for example, titanium or zirconium or mixtures thereof.

The considerations above regarding the positioning of the getter material according to the present invention are general and are suitable for the employment thereof independently of the mode of use of the material or of the particular structure of its container.

Non-limiting examples of hydrogen-sensitive systems which can obtain particular benefits from the use of the above-described getter devices are vacuum chambers, cryogenic liquids transportation (e.g. hydrogen or nitrogen), solar receivers, vacuum bottles, vacuum insulated flow lines (e.g. for steam injection), electronic tubes, dewars, etc.

The invention will be further illustrated by means of the following examples. These non-limiting examples illustrate some embodiments which are intended to teach the skilled person how to put the invention into practice.

EXAMPLES

Several polycrystalline ingots have been prepared by arc melting of appropriate mixtures of the high purity metallic constituent elements in an argon atmosphere. Each ingot has been then grinded by ball milling in a stainless steel jar under argon atmosphere and subsequently sieved to the desired powder fraction, i.e. less than 300 µm.

150 mg of each alloy listed in table 1 (see below) were pressed in annular containers in order to obtain the samples labeled as sample A, B, C, D, E, (according to the present invention) and reference 1.

TABLE 1

|  |  | Zr | Ti | V | Al |
|---|---|---|---|---|---|
| Reference 1 | % at | 45.1 | 15.03 | 30.3 | 9.54 |
| Sample A | % at | 44.5 | 14.8 | 28.5 | 12.1 |
| Sample B | % at | 44.0 | 14.7 | 26.9 | 14.4 |
| Sample C | % at | 43.5 | 14.5 | 25.3 | 16.6 |
| Sample D | % at | 42.6 | 14.2 | 22.3 | 20.9 |
| Sample E | % at | 41.7 | 13.9 | 19.4 | 25.0 |

They have been compared in their sorption performance versus hydrogen and carbon monoxide.

The test for $H_2$ and CO sorption capacity evaluation is carried out on an ultra-high vacuum bench. The getter sample is mounted inside a bulb and an ion gauge allows to measure the pressure on the sample, while another ion gauge allows to measure the pressure upstream of a conductance located between the two gauges. The getter is activated with a radiofrequency oven at 550° C.×60 min, afterwards it is cooled and kept at 200° C. A flow of $H_2$ or CO is passed on the getter through the known conductance, keeping a constant pressure of $3 \times 10^{-6}$ torr. Measuring the pressure before and after the conductance and integrating the pressure change in time, the pumping speed and the sorbed quantity of the getter can be calculated. The recorded data have been reported in table 2.

TABLE 2

|  | $H_2$ sorption rate (l/s) | CO sorption rate (l/s) |
|---|---|---|
| Reference 1 | 3.9 | 2.7 |
| Sample A | 16.8 | 7.7 |
| Sample B | 18.7 | 9.0 |
| Sample C | 20.1 | 9.4 |
| Sample D | 19.7 | 8.0 |
| Sample E | 18.5 | 6.9 |

The invention claimed is:

1. A getter device containing non-evaporable getter alloy powders having high gas sorption efficiency, particularly for hydrogen and carbon monoxide, wherein said alloy powders comprise as compositional elements zirconium, vanadium, titanium and aluminum and have an atomic percentage composition of said elements which can vary within the following ranges:

zirconium from 38 to 44.8%
vanadium from 14 to 29%
titanium from 13 to 15%
aluminum from 11.5 to 35% said atomic percentage ranges being considered with respect to the sum of zirconium, vanadium, titanium and aluminum in the non-evaporable getter alloy, said non-evaporable getter alloy optionally comprising one or more additional elements in an atomic percentage composition lower than 8% with respect to the total of the alloy composition, said one or more additional elements being selected from the group consisting of iron, chromium, manganese, cobalt or nickel in an atomic percentage composition comprised between 0.1 and 7% with respect to the total of the alloy composition while minor amounts of other chemical elements may be present in the alloy composition in a percentage lower than 1% with respect to the total of the alloy composition, being the sum of zirconium, vanadium, titanium, aluminum and said optionally present additional elements balanced to 100% atomic percentage composition.

2. The getter device according to claim 1, wherein said one or more additional elements are selected from the group consisting of iron, chromium, manganese, cobalt or nickel in an atomic percentage composition comprised between 0.1 and 5% with respect to the total of the alloy composition.

3. The getter device according to claim 1, wherein said getter alloy powders are mixed with metal powders.

4. The getter device according to claim 3, wherein said metal powders are selected between titanium and zirconium or mixtures thereof.

5. The getter device according to claim 1, wherein said alloy powders have a particle size lower than 500 μm.

6. The getter device according to claim 5, wherein said alloy powders have a particle size lower than 300 μm.

7. The getter device according to claim 1, wherein said alloy powders are compressed and sintered to form a single body getter element.

8. The getter device according to claim 7, wherein said getter device is a getter pump, a cartridge for a getter pump or a pump containing one or more pumping elements.

9. Use of the getter device according to claim 1 for the removal of hydrogen and carbon monoxide.

10. A hydrogen sensitive system containing the getter device according to claim 1.

* * * * *